United States Patent
Zhang (10) Patent No.: US 8,952,660 B2
(45) Date of Patent: Feb. 10, 2015

(54) SYSTEMS AND METHODS FOR BALANCING BATTERY CELLS

(75) Inventor: Wei Zhang, Shanghai (CN)

(73) Assignee: O2Micro, Inc., Santa Clara, CA (US)

( * ) Notice: Subject to any disclaimer, the term of this patent is extended or adjusted under 35 U.S.C. 154(b) by 466 days.

(21) Appl. No.: 13/220,158

(22) Filed: Aug. 29, 2011

(65) Prior Publication Data

US 2013/0033231 A1    Feb. 7, 2013

(30) Foreign Application Priority Data

Aug. 5, 2011    (CN) .......................... 2011 1 0228720

(51) Int. Cl.
*H02J 7/00* (2006.01)
*H01M 10/42* (2006.01)

(52) U.S. Cl.
CPC ......... *H01M 10/4207* (2013.01); *H02J 7/0031* (2013.01); *H01M 2010/4271* (2013.01); *Y02E 60/12* (2013.01); *H02J 7/0016* (2013.01)
USPC .......................................... 320/116; 320/134

(58) Field of Classification Search
USPC ....................................................... 320/116
See application file for complete search history.

(56) References Cited

U.S. PATENT DOCUMENTS

| | | | |
|---|---|---|---|
| 5,313,152 A | 5/1994 | Wozniak et al. | |
| 5,504,415 A * | 4/1996 | Podrazhansky et al. | 320/118 |
| 5,519,563 A | 5/1996 | Higashijima et al. | |
| 5,705,914 A | 1/1998 | Morita | |
| 6,008,623 A | 12/1999 | Chen et al. | |
| 6,020,718 A | 2/2000 | Ozawa et al. | |
| 6,160,376 A | 12/2000 | Kumar et al. | |
| 6,362,626 B2 | 3/2002 | Furukawa | |
| 6,452,362 B1 | 9/2002 | Choo | |
| 6,642,693 B2 | 11/2003 | Anzawa et al. | |
| 6,919,707 B2 | 7/2005 | Kawai et al. | |
| 7,049,791 B2 | 5/2006 | Lin et al. | |
| 7,091,695 B2 | 8/2006 | Miyazaki et al. | |
| 7,211,984 B2 | 5/2007 | Patel et al. | |
| 7,378,819 B2 | 5/2008 | Wang et al. | |
| 7,471,064 B2 | 12/2008 | Sobue et al. | |
| 7,564,217 B2 | 7/2009 | Tanigawa et al. | |
| 7,880,434 B2 | 2/2011 | White et al. | |
| 7,880,444 B2 | 2/2011 | Pellenc | |
| 7,939,965 B2 | 5/2011 | Oh et al. | |
| 7,973,515 B2 | 7/2011 | Densham et al. | |
| 8,022,669 B2 | 9/2011 | Li | |
| 8,054,034 B2 | 11/2011 | Lim et al. | |
| 2002/0017895 A1 | 2/2002 | Kawashima | |
| 2004/0027092 A1 | 2/2004 | Patel et al. | |

(Continued)

FOREIGN PATENT DOCUMENTS

| | | |
|---|---|---|
| CN | 1367565 A | 9/2002 |
| CN | 2625185 Y | 7/2004 |

(Continued)

*Primary Examiner* — Arun Williams (57) ABSTRACT

A cell balancing system includes multiple bypass paths and a battery management circuit. The multiple bypass paths are coupled in parallel to the battery cells. The battery management circuit is coupled to the bypass paths and monitors cell voltages of the battery cells, compares the cell voltages with a first reference voltage for a first stage, enables a bypass path in the first stage if a battery cell in parallel with the bypass path has a cell voltage at the first reference voltage, and compares the cell voltages of the battery cells with a second reference voltage for a second stage if a specified cell voltage in the first stage is at the first reference voltage.

18 Claims, 5 Drawing Sheets

(56) References Cited

U.S. PATENT DOCUMENTS

| | | | |
|---|---|---|---|
| 2004/0036446 A1* | 2/2004 | Iwashima | 320/116 |
| 2005/0194932 A1 | 9/2005 | Kokubu | |
| 2005/0269989 A1 | 12/2005 | Geren et al. | |
| 2006/0022639 A1 | 2/2006 | Moore | |
| 2006/0082343 A1 | 4/2006 | Sobue et al. | |
| 2006/0087287 A1 | 4/2006 | Thrap | |
| 2006/0103351 A1 | 5/2006 | Tanigawa et al. | |
| 2006/0139004 A1* | 6/2006 | Uesugi et al. | 320/132 |
| 2006/0255769 A1 | 11/2006 | Liu et al. | |
| 2009/0039830 A1 | 2/2009 | Pellenc | |
| 2009/0096420 A1 | 4/2009 | Lupu et al. | |
| 2009/0167243 A1 | 7/2009 | Xiao et al. | |
| 2009/0267566 A1 | 10/2009 | Yano | |
| 2010/0019724 A1 | 1/2010 | Mizutani et al. | |
| 2010/0190041 A1 | 7/2010 | Hou et al. | |
| 2010/0225275 A1 | 9/2010 | Bucur et al. | |

FOREIGN PATENT DOCUMENTS

| | | |
|---|---|---|
| CN | 1707903 A | 12/2005 |
| CN | 101103487 A | 1/2008 |
| CN | 101192756 A | 6/2008 |
| CN | 201122645 Y | 9/2008 |
| CN | 101414759 A | 4/2009 |
| CN | 101467324 A | 6/2009 |
| CN | 100533912 C | 8/2009 |
| CN | 100574082 C | 12/2009 |
| CN | 100588024 C | 2/2010 |
| CN | 201398088 Y | 2/2010 |
| EP | 0432639 A2 | 6/1991 |
| TW | I228340 B | 2/2005 |
| TW | I307568 B | 3/2009 |
| TW | M365010 U | 9/2009 |
| TW | 201008077 A | 2/2010 |
| TW | 201027880 A | 7/2010 |
| WO | 2011036867 A1 | 3/2011 |

* cited by examiner

FIG. 5

SYSTEMS AND METHODS FOR BALANCING BATTERY CELLS

CROSS REFERENCE TO RELATED APPLICATION

This Application claims priority to Patent Application Number 201110228720.X, filed on Aug. 5, 2011 with the State Intellectual Property Office of the P.R. China (SIPO), which is hereby incorporated by reference.

BACKGROUND

Figure 1:
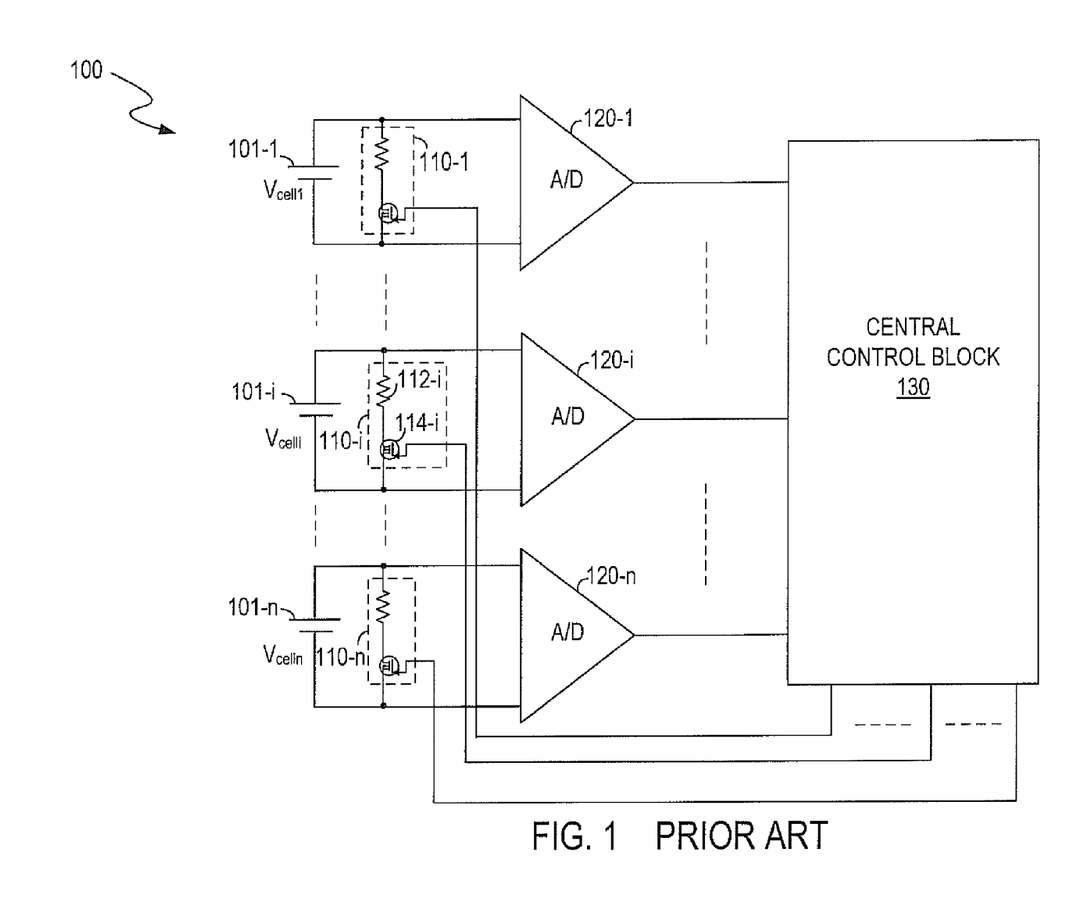
FIG. 1 shows a block diagram of a conventional cell balancing system.

FIG. 1 shows a block diagram of a conventional system 100 for balancing multiple battery cells 101-1 through 101-n. The cell balancing system 100 includes multiple bypass paths 110-1 through 110-n, multiple analog-to-digital (A/D) converters 120-1 through 120-n, and a central control block 130. Each bypass path coupled to a corresponding battery cell includes a resistor and a switch. The A/D converters 120-1 through 120-n are coupled to the battery cells 101-1 through 101-n, respectively. For example, a bypass path 110-i coupled to a battery cell 101-i includes a resistor 112-i and a switch 114-i. An A/D converter 120-i is coupled to the battery cell 101-i.

In operation, the A/D converter 120-i converts a cell voltage $V_{celli}$ of the battery cell 101-i into a digital signal and transmits the digital signal to the central control block 130. The central control block 130 receives digital signals representative of cell voltages $V_{cell1}$-$V_{celln}$ of the battery cells 101-1 through 101-n to determine if there is any battery cell undergoing an unbalanced condition. For example, a battery cell is detected as an unbalanced battery cell if a cell voltage difference between the detected battery cell and another battery cell is greater than a predetermined threshold. The central control block 130 switches on a switch in a bypass path coupled in parallel with the unbalanced battery cell to enable a bypass current for the unbalanced battery cell. However, the A/D converters 120-1 through 120-n are relatively expensive. As a result, the cost of the system 100 is relatively high.

SUMMARY

Embodiments according to the present invention pertain to a cell balancing system. In one embodiment, the cell balancing system includes multiple bypass paths and a battery management circuit. The multiple bypass paths are coupled in parallel to the battery cells. The battery management circuit is coupled to the bypass paths and monitors cell voltages of the battery cells, compares the cell voltages with a first reference voltage for a first stage, enables a bypass path in the first stage if a battery cell in parallel with the bypass path has a cell voltage at the first reference voltage, and compares the cell voltages of the battery cells with a second reference voltage for a second stage if a specified cell voltage in the first stage is at the first reference voltage.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 2:
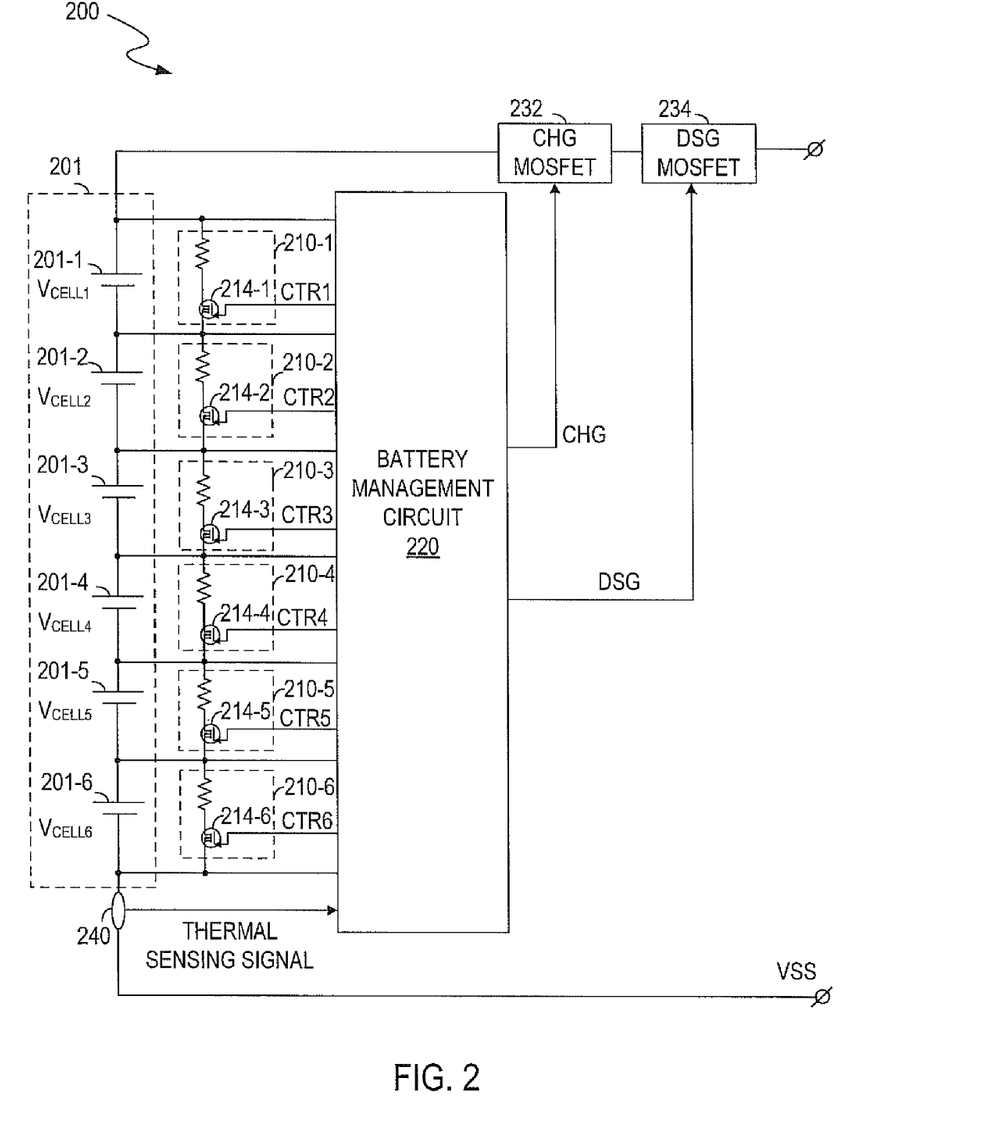
FIG. 2 shows a block diagram of an example of a cell balancing system, in accordance with one embodiment of the present invention.

FIG. 2 shows a block diagram of an example of a system 200 for balancing one or more battery cells, e.g., battery cells 201-1 through 201-6, collectively referred to as battery cells 201, in accordance with one embodiment of the present invention. In the example of FIG. 2, the cell balancing system 200 includes multiple bypass paths 210-1 through 210-6 coupled in parallel with battery cells 201-1 through 201-6, a battery management circuit 220 coupled to the bypass paths 210-1 through 210-6, and a thermal detection circuit 240 coupled to the battery cells 201-1 through 201-6 in series. Each of the bypass paths 210-1 through 210-6 includes a resistor and a switch, e.g., an N-channel MOSFET, as shown in the example of FIG. 2. In one embodiment, each switch is controlled by the battery management circuit 220. More specifically, the battery management circuit 220 generates multiple control signals, e.g., CTR1-CTR6, and each switch is turned on or off by a corresponding control signal. Since the embodiment shown in FIG. 2 is only for illustrative purposes, there can be any number of battery cells, depending on the requirements of particular applications.

In one embodiment, the battery management circuit 220 monitors the cell voltages, e.g., $V_{CELL1}$ through $V_{CELL6}$ ($V_{CELL1}$-$V_{CELL6}$), of the battery cells 201-1 through 201-6, and compares each of the cell voltages $V_{CELL1}$ through $V_{CELL6}$ with multiple reference voltages, e.g., V1 through Vn, in successive stages, respectively. For example, the battery management circuit 220 compares each of the cell voltages $V_{CELL1}$-$V_{CELL6}$ with a first reference voltage V1 in a first stage, compares each of the cell voltages $V_{CELL1}$-$V_{CELL6}$ with a second reference voltage V2 in a second stage, and so on. In one embodiment, the number of the stages depends on the requirements of the cell balancing system. For example, for a battery cell with the nominal voltage of 2V, there can be 20 stages for the cell balancing system, and the difference between adjacent reference voltages is 100 mv.

In one embodiment, in a charging mode, if a cell voltage $V_{CELLi}$ (where i represents any number from 1 to 6) increases to a corresponding reference voltage in a stage, then the battery management circuit 220 generates a control signal CTRi to enable the bypass path 210-$i$ to conduct a bypass current for the unbalanced battery cell 201-$i$. Moreover, in each stage, the enabled bypass path 210-$i$ remains enabled until the minimum cell voltage $V_{min}$ of the cell voltages $V_{CELL1}$-$V_{CELL6}$ in the stage increases to the corresponding reference voltage ($V_{min}$ refers to the lowest value of the cell voltages $V_{CELL1}$-$V_{CELL6}$ in the stage). Then, the battery management circuit 220 disables all the enabled bypass paths, and compares each of the cell voltages $V_{CELL1}$-$V_{CELL6}$ with a next reference voltage in a next stage. For example, if a cell voltage $V_{CELL2}$ of the battery cell 201-2 increases to a third reference voltage V3 in a third stage, then the battery management circuit 220 generates a control signal CTR2 to switch on a switch 214-2 in the bypass path 210-2 to enable a bypass current for the unbalanced battery cell 201-2. In the third stage, when another cell voltage increases to the third reference voltage V3, the battery management circuit 220 continues to enable the corresponding bypass path. And in the third stage, the enabled bypass paths would remain enabled until the minimum cell voltage $V_{min}$ of the cell voltages $V_{CELL1}$-$V_{CELL6}$ increases to the third reference voltage V3. Then, the battery management circuit 220 compares each of the cell voltages $V_{CELL1}$-$V_{CELL6}$ with a fourth reference voltage V4 in the fourth stage. The operations of the cell balancing system 200 in the next stage are the same as the operations in the previous stage.

The thermal detection circuit 240 in the cell balancing system 200 monitors the temperature of the battery cells 201, and sends a thermal sensing signal indicative of the temperature to the battery management circuit 220. The battery management circuit 220 receives the thermal sensing signal and compares the signal with a specified threshold. If the thermal sensing signal is greater than the threshold, the battery management circuit 220 disables one or more enabled bypass paths to decrease the temperature of the cell balancing system 200. In one embodiment, the greater the difference between the thermal sensing signal and the threshold, the more enabled bypass paths are disabled.

In one embodiment, the battery management circuit 220 disables the enabled bypass paths depending on the relative priorities of the bypass paths. For example, the battery management circuit 220 disables an enabled bypass path with the lowest priority first. In one embodiment, in each stage, the priority can be determined based on a difference between a cell voltage $V_{CELLi}$ of a battery cell 201-$i$ and a corresponding reference voltage in the stage. More specifically, in each stage, if a difference between a cell voltage $V_{CELLi}$ and the corresponding reference voltage is the largest, the bypass path 210-$i$ coupled in parallel with the battery cell 201-$i$ is given the highest priority, and if a difference between a cell voltage $V_{CELLm}$ and the corresponding reference voltage is the smallest, the bypass path 210-$m$ coupled in parallel with the battery cell 201-$m$ is given the lowest priority.

The cell balancing system 200 can further include a charge switch 232 and a discharge switch 234, e.g. MOSFETs, as shown in the example of FIG. 2. In one embodiment, the battery management circuit 220 can generate a control signal CHG to disable the charging switch 232 in a charging mode, or a control signal DSG to disable the discharging switch 234 in a discharging mode, if an abnormal condition occurs. For example, if any cell voltage is greater than a maximum voltage threshold in the charging mode, the battery management circuit 220 can terminate charging of the battery cells 201-1 through 201-6 by disabling the charging switch 232 to protect the battery cells 201-1 through 201-6. If any cell voltage is lower than a minimum voltage threshold in the discharging mode, the battery management circuit 220 can terminate discharging of the battery cells 201-1 through 201-6 by disabling the discharging switch 234 to protect the battery cells 201-1 through 201-6.

Advantageously, because the cell balancing system 200 compares the battery cell voltages with multiple reference voltages in successive stages, the cell balancing effect is improved. Moreover, the cost of the cell balancing system 200 is reduced by reducing the number of components.

Figure 3:
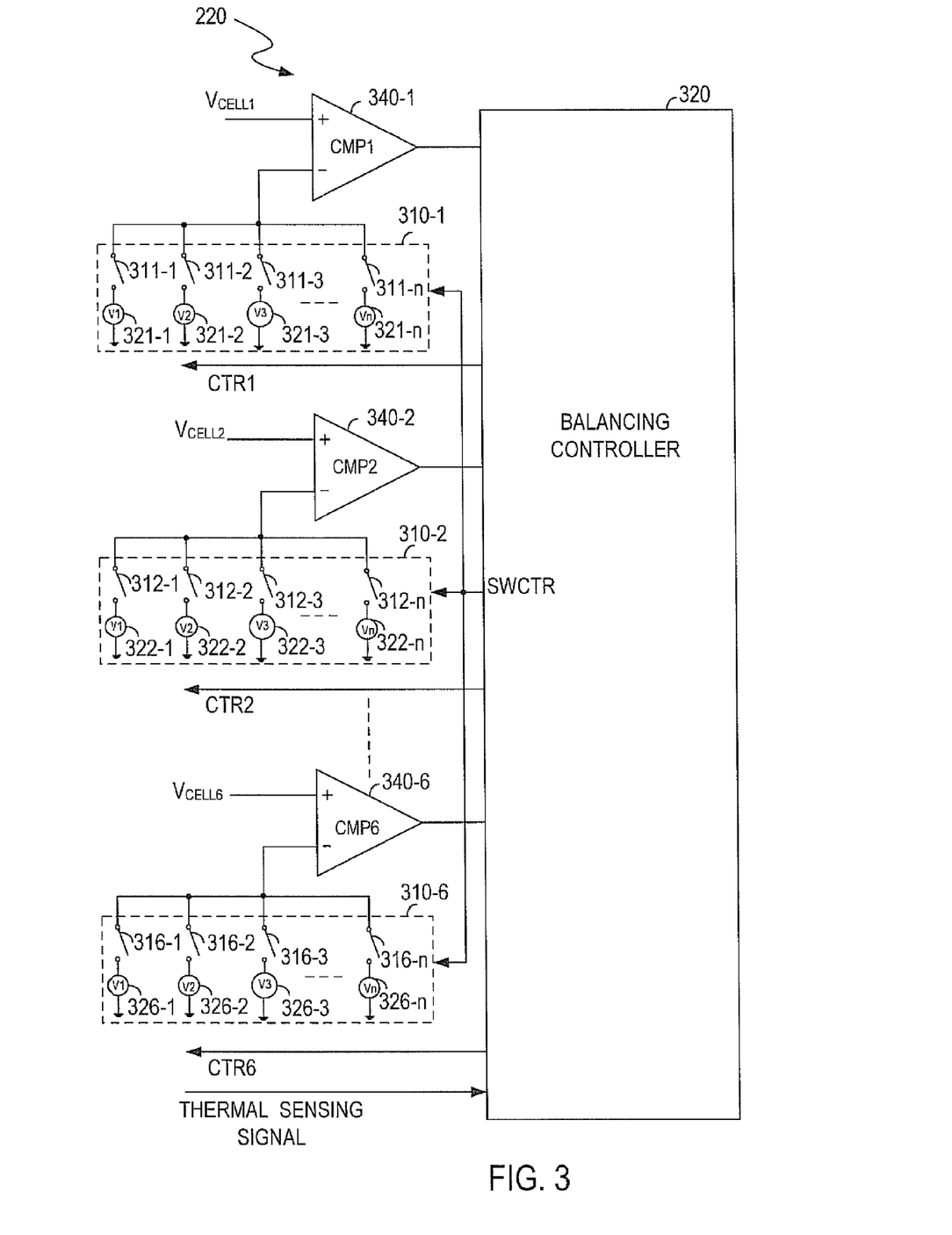
FIG. 3 shows a block diagram of an example of a battery management circuit in a cell balancing system, in accordance with one embodiment of the present invention.

FIG. 3 shows a block diagram of an example of the battery management circuit 220 in the cell balancing system 200 in FIG. 2, in accordance with one embodiment of the present invention. FIG. 3 is described in combination with FIG. 2. In the example of FIG. 3, the battery management circuit 220 includes one or more comparison circuits, e.g. comparators 340-1 through 340-6, multiple reference voltage selectors, e.g., 310-1 through 310-6, coupled to the comparators 340-1 through 340-6, respectively, and a balancing controller 320 coupled to the comparators 340-1 through 340-6. In one embodiment, each comparator compares a cell voltage with a selected reference voltage from the reference voltage selector coupled to the comparator. Each reference voltage selector includes one or more switches and one or more reference voltage generators, e.g. voltage sources, coupled to the switches, respectively. For example, the reference voltage selector 310-1 includes multiple switches 311-1 through 311-$n$ and multiple voltage sources 321-1 through 321-$n$, the reference voltage selector 310-2 includes multiple switches 312-1 through 312-$n$ and multiple voltage sources 322-1 through 322-$n$, and the reference voltage selector 310-6 includes multiple switches 316-1 through 316-$n$ and multiple voltage sources 326-1 through 326-$n$, etc., as shown in the example of FIG. 3.

In one embodiment, in each stage, the balancing controller 320 can generate a signal SWCTR to control a switch in each reference voltage selector in order to select a reference voltage (e.g., reference voltage V1 in the first stage, reference voltage V2 in the second stage, etc.). The reference voltage is selected when a switch coupled to a voltage source with the reference voltage is turned on by the signal SWCTR. Each comparator can then compare the cell voltage with the selected reference voltage. For example, in the first stage, the balancing controller 320 generates the signal SWCTR to turn on the first switch in each reference voltage selector (e.g. switch 311-1 in the reference voltage selector 310-1, switch 312-1 in the reference voltage selector 310-2, etc.) to select the first reference voltage V1. Thus, each comparator 340-$i$ compares the cell voltage $V_{CELLi}$ with the first reference voltage V1 in the first stage. The balancing controller 320 receives the outputs of the comparators 340-1 through 340-6.

In one embodiment, when the battery cells 201-1 through 201-6 are in the charging mode, if a cell voltage $V_{CELLi}$ of a battery cell 201-$i$ increases to a reference voltage Vm in a corresponding stage, then the balancing controller 320 generates a control signal CTRi to enable the bypass path 210-$i$ coupled in parallel with the unbalanced battery cell 201-$i$. During the stage, the enabled bypass paths can remain enabled until the minimum cell voltage $V_{min}$ of the cell voltages $V_{CELL1}$-$V_{CELL6}$ in the stage increases to the reference voltage Vm. Then, the balancing controller 320 disables the enabled bypass paths, and generates the signal SWCTR to selected the next reference voltage V(m+1) (e.g., by switching on the switch coupled to the voltage source with the reference voltage V(m+1)). Then, the comparators 340-1 through 340-6 compare the each of cell voltages $V_{CELL1}$-$V_{CELL6}$ with the reference voltage V(m+1) in the next stage.

In one embodiment, the balancing controller 320 further receives a thermal sensing signal from the thermal detection circuit 240, and disables the enabled bypass paths based on the relative priorities of the enabled bypass paths if the thermal sensing signal is greater than a specified threshold.

Figure 4:
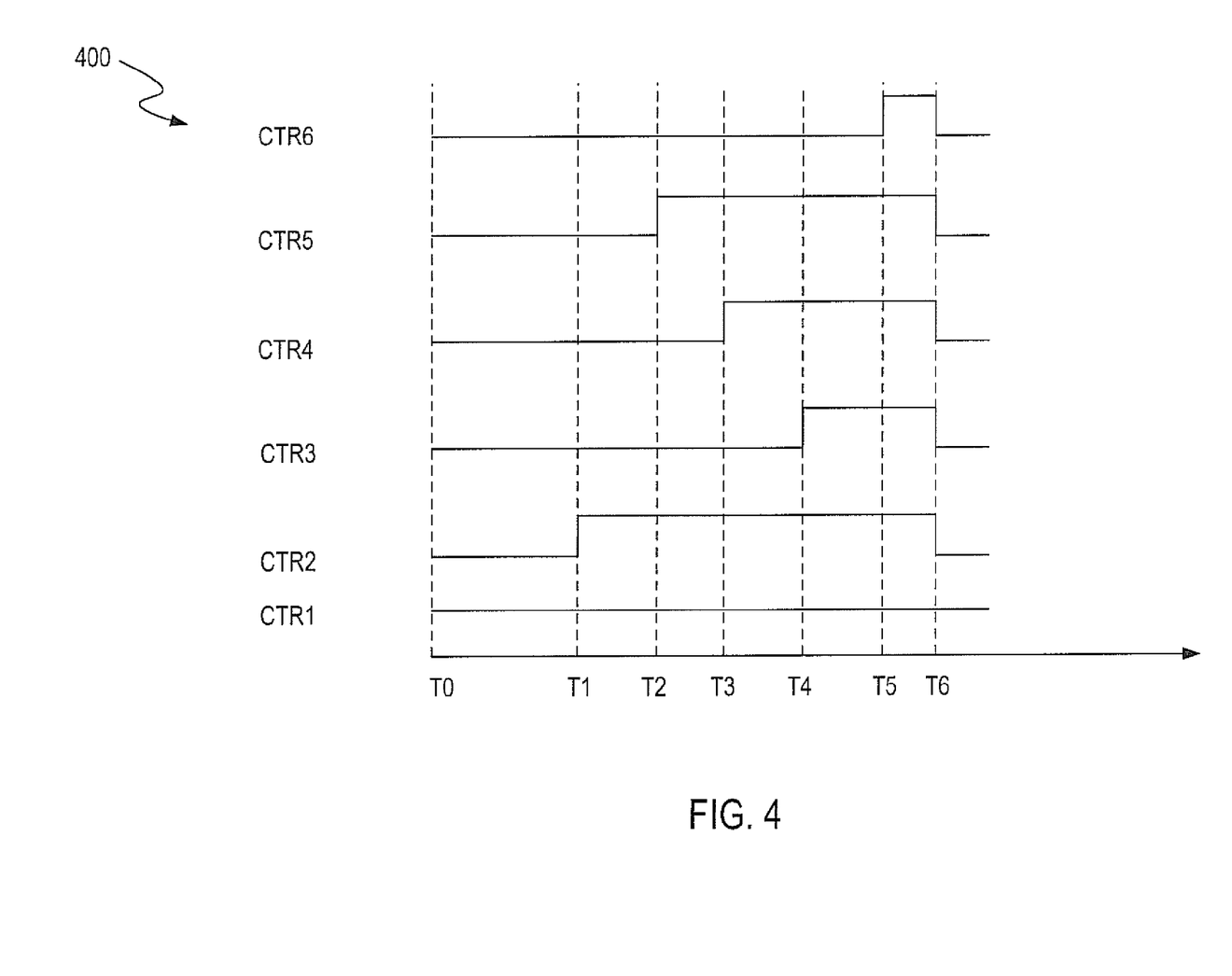
FIG. 4 shows a timing diagram for examples of control signals associated with switches in a battery management circuit in a stage in the charging mode, in accordance with one embodiment of the present invention.

FIG. 4 shows a timing diagram for examples of control signals associated with switches 214-1 through 214-6 in FIG. 2 in a stage in the charging mode, in accordance with one embodiment of the present invention. FIG. 4 is described in combination with FIG. 2.

As shown in the example of FIG. 4, at time T0, a stage begins, and the battery management circuit 220 compares the cell voltages $V_{CELL1}$-$V_{CELL6}$ with a reference voltage Vj for this stage. Because the battery cells 201-1 through 201-6 are in the charging mode, the relationship among the reference voltages is: V1< ... <Vj< ... <Vn. The cell voltages $V_{CELL1}$-$V_{CELL6}$ increase with the charging of the battery cells 201-1 through 201-6. The control signals CTR1-CTR6 are in a first state, e.g., logic low, during T0 to T1, and the switches 214-1 through 214-6 remain off. If a cell voltage $V_{CELLi}$ increases to the reference voltage Vj, the control signal CTRi is in a second state, e.g., logic high, which switches on the corresponding switch 214-i to enable a bypass current for the battery cell 201-i.

More specifically, as shown in the example of FIG. 4, at time T1, cell voltage $V_{CELL2}$ increases to the reference voltage Vj first, and the control signal CTR2 is logic high to switch on the switch 214-2 in order to enable a bypass current for the battery cell 201-2. At time T2, cell voltage $V_{CELL5}$ increases to the reference voltage Vj, and the control signal CTR5 is high to switch on the switch 214-5 in order to enable a bypass current for the battery cell 201-5. At time T3, the cell voltage $V_{CELL4}$ increases to the reference voltage Vj, and the control signal CTR4 is high to switch on the switch 214-4. At time T4, the cell voltage $V_{CELL3}$ increases to the reference voltage Vj, and the control signal CTR3 is high to switch on the switch 214-3. At time T5, the cell voltage $V_{CELL6}$ increases to the reference voltage Vj, and the control signal CTR6 is high to switch on the switch 214-6. All the switches 214-2 through 214-6 remain on once they are switched on until time T6. At time T6, the minimum cell voltage $V_{CELL1}$ during the stage increases to the reference voltage Vj. The control signals CTR1-CTR6 are in the first state, e.g., logic low, to switch off the switches 214-1 through 214-6, and the next stage begins at time T6. The battery management circuit 220 compares each of the battery cell voltages $V_{CELL1}$-$V_{CELL6}$ with the next reference voltage V(j+1) during the next stage.

In one embodiment, if more than one cell voltage increases to the reference voltage Vj at the same time, the corresponding switches can be switched on simultaneously. The timing diagram shown in FIG. 4 is only for illustrative purposes; other implementations not shown in the timing diagram are possible depending on the charging process of the battery cells.

Figure 5:
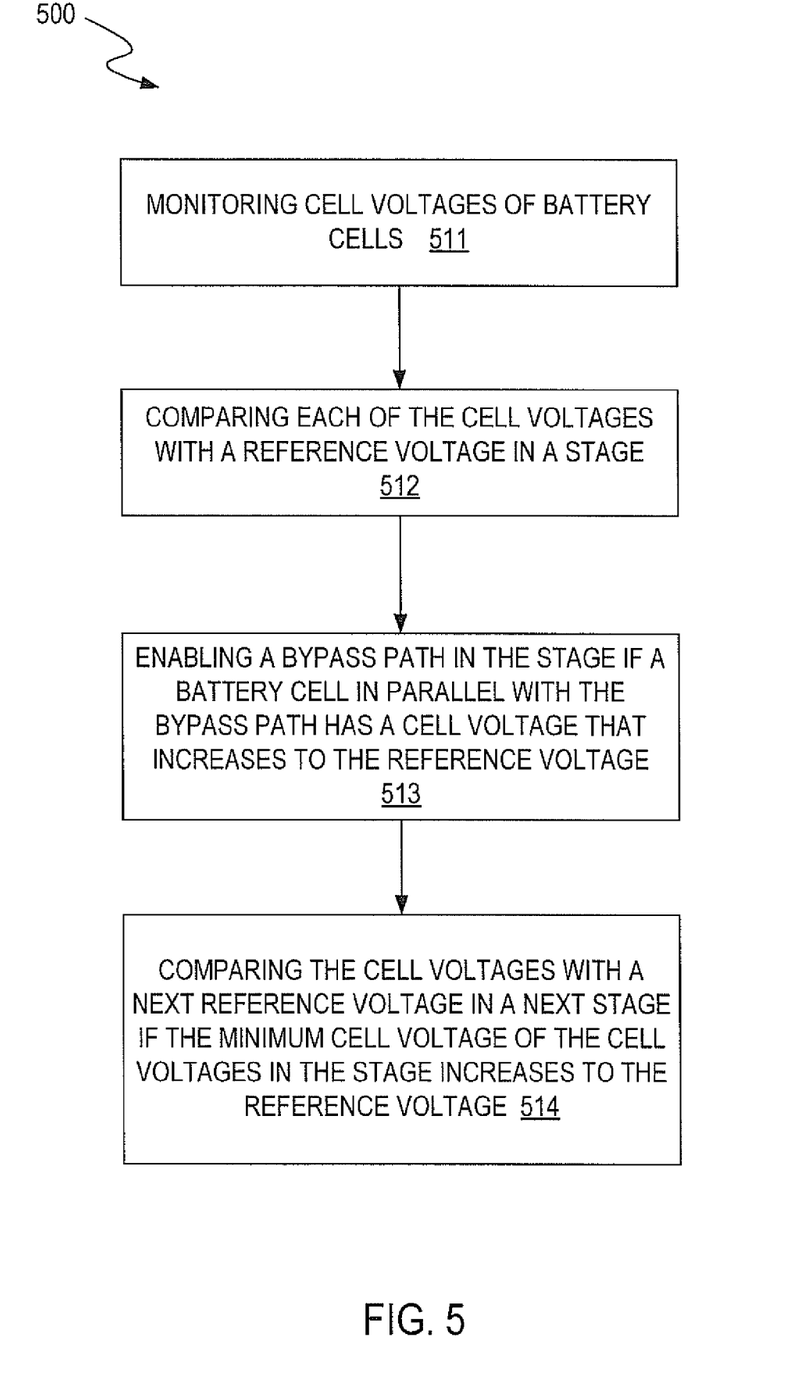
FIG. 5 shows a flowchart of examples of operations performed by a cell balancing system in a charging mode, in accordance with one embodiment of the present invention.

FIG. 5 shows a flowchart 500 of examples of operations performed by a cell balancing system 200 in FIG. 2 in a charging mode, in accordance with one embodiment of the present invention. FIG. 5 is described in combination with FIG. 2.

In block 511, a cell balancing system 200 monitors cell voltages of one or more battery cells, e.g., battery cells 201-1 through 201-6 as shown in the example of FIG. 2. In block 512, a battery management circuit 220 as shown in FIG. 2 compares each of the cell voltages $V_{CELL1}$-$V_{CELL6}$ of battery cells 201-1 through 201-6 with a reference voltage Vj in a stage.

In block 513, the battery management circuit 220 enables a bypass path 210-i in the stage if a battery cell 201-i in parallel with the bypass path 210-i has a cell voltage $V_{CELLi}$ that increases to the reference voltage Vj. For example, if a cell voltage $V_{CELL2}$ increases to the reference voltage Vj, then the battery management circuit 220 enables the bypass path 210-2 coupled in parallel with the battery cell 201-2, and thus a bypass current flows through the bypass path 210-2 for the battery cell 201-2. The battery management circuit 220 continues to enable another bypass path if a corresponding battery cell in parallel with the bypass path has a cell voltage that has increased to the reference voltage Vj.

In block 514, if the minimum cell voltage $V_{min}$ of the cell voltages $V_{CELL1}$-$V_{CELL6}$ in the stage increases to the reference voltage Vj, the battery management circuit 220 disables the bypass paths which are enabled in the stage, and selects the next reference voltage V(j+1). Thus, the cell balancing system 200 compares each of the cell voltages $V_{CELL1}$-$V_{CELL6}$ with the next reference voltage V(j+1) in the next stage. The operations of the cell balancing system 200 in the next stage and the following stages are the same as the operation in the previous stage.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A cell balancing system for balancing a plurality of battery cells, comprising:
a plurality of bypass paths coupled in parallel to said battery cells;
a battery management circuit coupled to said bypass paths and operable for monitoring cell voltages of said battery cells in a charging mode, operable for comparing said cell voltages with a reference voltage to determine which bypass path of said bypass paths to enable, operable for setting said reference voltage to a first reference voltage in a first stage of said charging mode, operable for enabling a first bypass path of said bypass paths in said first stage if a first battery cell in parallel with said first bypass path has a cell voltage at said first reference voltage in said first stage, operable for, if the minimum cell voltage of said cell voltages in said first stage increases to said first reference voltage, then disabling said first bypass path and entering a second stage of said charging mode, and operable for, in said second stage, setting said reference voltage to a second reference voltage that is greater than said first reference voltage.

2. The cell balancing system as claimed in claim 1, wherein said battery management circuit enables a second bypass path of said bypass paths in said second stage if a second battery cell in parallel with said second bypass path has a voltage at said second reference voltage in said second stage.

3. The cell balancing system as claimed in claim 2, wherein if the minimum cell voltage of said cell voltages in said second stage increases to said second reference voltage, then said battery management circuit disables said second bypass path and enters a third stage of said charging mode, and wherein in said third stage, said battery management circuit sets said reference voltage to a third reference voltage that is greater than said second reference voltage.

4. The cell balancing system as claimed in claim 1, further comprising:
a thermal detection circuit coupled to said battery cells and operable for detecting a temperature of said battery cells,
wherein said thermal detection circuit sends a thermal sensing signal representative of said temperature to said battery management circuit.

5. The cell balancing system as claimed in claim 4, wherein said battery management circuit compares said thermal sensing signal with a threshold, selects an enabled bypass path according to a priority of said enabled bypass path, and disables said enabled bypass path if said thermal sensing signal exceeds said threshold.

6. The cell balancing system as claimed in claim 5, wherein said priority is determined based on a difference between a cell voltage of a battery cell coupled in parallel with said enabled bypass path and said first reference voltage.

7. The cell balancing system as claimed in claim 1, wherein if said first bypass path is enabled in said first stage, then said battery management circuit controls said first bypass path to remain enabled in said first stage before entering said second stage.

8. A cell balancing circuit for balancing a plurality of battery cells, comprising:
a comparison circuit operable for receiving cell voltages of said battery cells in a charging mode, and for comparing said cell voltages with a reference voltage to determine which bypass path of a plurality of bypass paths coupled in parallel with said battery cells to enable; and
a balancing controller coupled to said comparison circuit, and operable for setting said reference voltage to a first reference voltage in a first stage of said charging mode, and operable for enabling a first bypass path of said bypass paths in said first stage if a first battery cell in parallel with said first bypass path has a cell voltage at said first reference voltage in said first stage, operable for, if the minimum cell voltage of said cell voltages in said first stage increases to said first reference voltage, disabling said first bypass path and entering a second stage of said charging mode, and operable for, in said second stage, setting said reference voltage to a second reference voltage that is greater than said first reference voltage.

9. The cell balancing circuit as claimed in claim 8, wherein said balancing controller enables a second bypass path of said bypass paths in said second stage if a second battery cell in parallel with said second bypass path has a cell voltage at said second reference voltage in said second stage.

10. The cell balancing circuit as claimed in claim 9, wherein if the minimum cell voltage of said cell voltages in said second stage increases to said second reference voltage, then said balancing controller disables said second bypass path and enters a third stage of said charging mode, and wherein in said third stage, said balancing controller sets said reference voltage to a third reference voltage that is greater than said second reference voltage.

11. The cell balancing circuit as claimed in claim 8, wherein said balancing controller receives a thermal sensing signal representative of a temperature of said battery cells, and compares said thermal sensing signal with a threshold.

12. The cell balancing circuit as claimed in claim 11, wherein said balancing circuit disables an enabled bypass path according to a priority of said enabled bypass path if said thermal sensing signal exceeds said threshold.

13. The cell balancing circuit as claimed in claim 8, wherein if said first bypass path is enabled in said first stage, then said balancing controller controls said first bypass path to remain enabled in said first stage before entering said second stage.

14. A method for balancing a plurality of battery cells, comprising:
monitoring cell voltages of said battery cells in a charging mode;
comparing, using a comparison circuit, said cell voltages with a reference voltage to determine which bypass path of a plurality of bypass paths coupled in parallel with said battery cells is to be enabled;
setting said reference voltage to a first reference voltage in a first stage of said charging mode;
enabling a first bypass path of said bypass paths in said first stage if a first battery cell in parallel with said first bypass path has a cell voltage at said first reference voltage;
disabling said first bypass path and controlling said comparison circuit to enter a second stage of said charging mode, if the minimum cell voltage of said cell voltages in said first stage increases to said first reference voltage; and
setting said reference voltage to a second reference voltage that is greater than said first reference voltage, in said second stage.

15. The method as claimed in claim 14, further comprising:
enabling a second bypass path of said bypass paths in said second stage if a second battery cell in parallel with said second bypass path has a cell voltage at said second reference voltage.

16. The method as claimed in claim 15, further comprising:
disabling said second bypass path and controlling said comparison circuit to enter a third stage of said charging mode, if the minimum cell voltage of said cell voltages in said second stage increases to said second reference voltage; and
setting said reference voltage to a third reference voltage that is greater than said second reference voltage, in said third stage.

17. The method as claimed in claim 14, further comprising:
detecting a temperature of said battery cells by a thermal detection circuit;
comparing a thermal sensing signal representative of said temperature with a threshold; and
disabling an enabled bypass path according to a priority of said enabled bypass path if said thermal sensing signal exceeds said threshold,
wherein said priority of said enabled bypass path is determined based on a difference between a cell voltage of a battery cell coupled in parallel with said enabled bypass path and said first reference voltage.

18. The method as claimed in claim 14, further comprising:
if said first bypass path is enabled in said first stage, then controlling said first bypass path to remain enabled in said first stage before entering said second stage.

* * * * *